United States Patent [19]
Koch

[11] Patent Number: 5,109,598
[45] Date of Patent: May 5, 1992

[54] METHOD AND APPARATUS FOR FEEDING CABLE TO A CABLE PROCESSOR

[75] Inventor: Max Koch, Meggen, Switzerland

[73] Assignee: TTC Technology Trading Company, Meggen, Switzerland

[21] Appl. No.: 571,325

[22] Filed: Aug. 22, 1990

[30] Foreign Application Priority Data

Oct. 18, 1989 [CH] Switzerland ............... 03786/89

[51] Int. Cl.$^5$ ............................................. H01R 43/00
[52] U.S. Cl. .................................... 29/825; 29/33 M; 29/728; 29/745; 81/9.51; 226/171; 33/735; 33/740
[58] Field of Search ............... 226/171; 81/9.51; 83/151; 29/33 M, 867, 825, 745, 728, 828; 33/735, 740

[56] References Cited

U.S. PATENT DOCUMENTS

| | | | |
|---|---|---|---|
| 3,368,428 | 2/1968 | Gudmestad | 81/9.51 |
| 3,612,111 | 10/1971 | Meyer | 81/9.51 X |
| 3,874,076 | 4/1975 | Tsukamoto et al. | 29/728 X |
| 4,099,428 | 7/1978 | Senior et al. | 81/9.51 |
| 4,179,056 | 12/1979 | Schmerling | 226/171 |
| 4,521,946 | 6/1985 | Dusel et al. | 29/33 M |
| 4,852,249 | 8/1989 | Muskulus et al. | 29/745 X |

FOREIGN PATENT DOCUMENTS 185788 7/1986 European Pat. Off. .
2047460 4/1971 Fed. Rep. of Germany .
2077518 12/1981 United Kingdom .

Primary Examiner—Carl J. Arbes
Attorney, Agent, or Firm—Horst M. Kasper

[57] ABSTRACT

The method and the apparatus for the performance of the method for feeding cable into an automatic cable-processing machine allows to move normal cables (18) and cables of reduced wall thickness at high speeds. The cable (18) is driven by the driving surfaces (3.1, 8.1) of two belts, (3, 8), where the belts (3, 8) of two belt drives (b 1.2), roll off one another. The first belt drive (1) is stationary, while the second belt drive (2) is arranged to be parallel displaceable and disposed perpendicular to its driving surface (8.1). The second belt drive (2) can be pressed onto a laid-in cable (18) by at least one pneumatic piston-cylinder unit (24). In order to assure a clean passage of a cable (18) through the belt drives (1, 2), a cable clamping and tightening device (19) is arranged on the cable feed side (16), and a cable-clamping device (20) is arranged on the cable exit side (17). Thereby, the laid-in cable (18) is tightened and precisely aligned before the start of operations. The driving surface (8.1) of the displaceable belt drive (2) projects beyond the driving surface (3.1) of the stationary belt drive (1) and serves for the reception of a driving roller (21) of an adjustable cable length-measuring apparatus (22).

6 Claims, 2 Drawing Sheets

METHOD AND APPARATUS FOR FEEDING CABLE TO A CABLE PROCESSOR

DESCRIPTION

1. Field of the Invention

The invention concerns a method and an apparatus for the performance of the method for the feeding of a cable into an automatic cable processing machine, with two oppositely directed belt drives and a cable length-measuring apparatus measuring the pre-set length of a cable portion, wherein a first belt drive with two deflecting rollers and a belt is fixably arranged and a second belt drive displays a fixed drivable deflecting roller and a presser foot apparatus which carries a second deflecting roller, is borne to be parallelly displaceable perpendicularly to the feed direction of the cable and which by a force presses the belt of the second belt drive against the belt of the first belt drive or against the cable laid in between both the belts and moves the cable through both driven belts towards the automatic cable-processing machine.

2. Brief Description of the Background of the Invention including Prior Art.

Such an apparatus for the transporting of a cable into a wire-cutting and insulation-stripping device has become known by the U.S. Pat. No. 3,612,111. By this apparatus, the wire is clamped in between two oppositely directed belt drives and transported through both the driven belt. Toothed belts with smooth surface, which are deflected by way of two deflecting rollers, serve as driving belts. A belt drive is built in stationarily and between both the deflecting rollers possesses a fixedly installed pressure shoe extending over a certain length. The second belt drive displays a first stationary and driven deflecting roller and a second movable deflecting roller. The movable deflecting roller is arranged together with a pressure shoe on a pressure plate parallely displaceable perpendicularly to the feed direction of the wire. The pressure plate is urged by the force of two compression springs towards the fixedly installed pressure shoe of the stationary belt drive so that both the toothed belts are pressed each against the other between both the pressure shoes or the wire laid in between both the belts is clamped. For laying a wire between both the oppositely directed belts, the pressure plate together with the pressure shoe and the second deflecting roller can be drawn away from the stationary belt drive against the force of both the compression springs with the aid of a threaded rod and a spindle nut.

A disadvantage of this cable-transporting apparatus lies in that the friction between the shoes and the toothed sides of the toothed belts causes wear and noises and does not permit an increase in the belt speed. A further disadvantage also lies in that certain inaccuracies can arise in the length measurement of the wire portions in that the movement of the wire is picked up indirectly from the rotation of the driven deflecting wheel of the fixed belt drive.

A further device for the transporting of a wire into an automatic wire-preparing machine has become known by the DE-OS 1 590 074, in which the wire is driven during each operating cycle by two belt drives pivotting each against the other. Both belt drives are driven continuously during the operation and pivot apart for the freeing of the wire for cutting and preparing operations. A guide tube, which is movable to an fro along the wire, then moves simultaneously between both the belt drives in order to hold the wire in the correct position during the freeing. Both drives are constructed as pivot levers and possess driving belts with flat outer driving surface and longitudinally grooved inner surfaces, which are laid around two deflection rollers and an adjustable pressure roller. The fixedly arranged pivot axles are at the same time the axles for the reception of the driven deflecting rollers. Between the not driven deflecting rollers and the adjustable pressure rollers, the driving belt in both belt drives forms a respective oppositely directed driving surface for the entrained movement of the wire. Both these oppositely directed driving surfaces let themselves be set parallely for a certain wire thickness through displacement of the adjustable pressure roller. When the wire thickness changes, the parallelism of both the driving surfaces is no longer given and uniform pressure distribution over a certain belt length is thereby no longer assured in that either the deflecting roller or the pressure roller acts with greater pressure on the wire. This apparatus would not be suitable for greater cable speeds and for a movement of the wire in the direction opposite to the feed direction.

SUMMARY OF THE INVENTION

1. Purposes of the Invention

The invention is therefore based on the task of proposing a method and an apparatus for the performance of the method, which are suitable for greater cable speeds and are capable of moving the cable to and fro measurably in both directions in the longitudinal axis.

These and other objects and advantages of the present invention will become evident from the description which follows.

2. Brief Description of the Invention

The instant invention provides for a method for feeding a cable into a automatic cable-processing machine. A selected cable is led through a cable clamping and tightening device. This selected cable is laid between the spaced-apart driving surfaces of the toothed belts of a stationary belt drive and displaceably supported belt drive and over the driving roller of a cable length-measuring equipment and is led through a cable-clamping device. The cable is clamped by the clamping and tightening device. The clamping device is tightened by a displacement of the clamping and tightening device. The displaceably supported belt drive is pushed onto the tensioned cable and pressed on by a force. Both of the belt drives are driven in a mutually opposite direction of a rotation with simultaneous opening of the clamping and tightening device and the clamping device, while the cable is moved forwards and the driving roller of the cable length-measuring equipment is driven. The movement of the cable is interrupted and the exact present cable length is established. The automatic cable-processing machine with a cutting equipment and an insulation-stripping equipment and possibly a crimping press is actuated and the cable is cut. The two ends, resulting from the cut cable, are stripped of insulation and possibly provided with a crimped contact. The cut cable is led away and the remaining cable is moved forward again by a preselected cable length.

An apparatus for the performance of the method for the feeding of a cable into an automatic cable-processing machine comprises two oppositely directed belt drives and a cable length-measuring apparatus measuring the preset length of a cable portion. A first belt drive contains two deflecting rollers. A toothed belt drive is fixedly arranged. A second belt drive displays a fixed drivable deflecting roller and a pressure means device. The pressure means device carries a second deflecting roller and is parallel supported and is displaceable perpendicular to the feed direction of the cable. A force presses the toothed belt of the second belt drive either against the toothed belt of the first belt drive or against the cable laid in between both of the toothed belts and moves the cable through both the driven toothed belts towards the clamping device. The first and fixedly arranged belt drive displays a driving surface. The driving surface is formed between the non-driven deflecting roller and at least one pressure roller. The pressure means device of the second belt drive displays a carrier plate. A pressure roller is arranged opposite the non-driven deflecting roller. A salient deflecting roller and at least one further pressure roller, together with the toothed belt form a driving surface. The driving surface is projected beyond the driving surface of the fixed belt drive, At least one pneumatic piston-cylinder unit, which is capable of displacing the driving surface of the second belt drive towards the driving surface of the first belt drive, is articulated at the carrier plate. A driving roller of the cable length-measuring apparatus is arranged in the region of the protruding driving surface. The driving roller is disposed opposite to the deflecting roller of the second belt drive. A clamping and tightening device, which displaceable in the axial direction of the cable and which clamps and tightens the cable, is provided on the cable feed side. A fixed clamping device, which clamps the cable, is provided on the cable exit sides.

The advantages achieved by the invention are to be seen substantially in that a wire or a cable is tightenable in the axial direction above all on first being laid in, whereby entries, which are susceptable to faults, into the cutting station and inaccurate lengths are avoided, that wire or cables reduced in wall thickness can be transported without damage and that greater cable speeds are possible. Thus, the invention apparatus allows longer transport speeds for the cables than the apparatus known in the art without increasing the operating noise or the wear of the drive elements of the invention apparatus. The accuracy of the cable lengths, particularly in the case of greater cable speeds, is achieved in that the cable be moved in both a forward and a backward direction without buckling. With the aid of a four-quadrant regulator, a possibly traversed length can then be compared to a reference value and adjusted exactly. Through the increase in cable speed, the fabrication speed of the cable treatment can also be increased so that the output and thereby the economics of the entire plant are raised.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

There show:

FIG. 1 an elevation of an appartus for the feeding of a cable into an automatic cable-processing machine in the extended rest setting for drawing a cable in before the beginning of the operating process and FIG. 2 an elevation of the apparatus for the feeding of a cable into the automatic cable-processing machine in the retracted operational setting.

DESCRIPTION OF INVENTION AND PREFERRED EMBODIMENT

Figure 1:
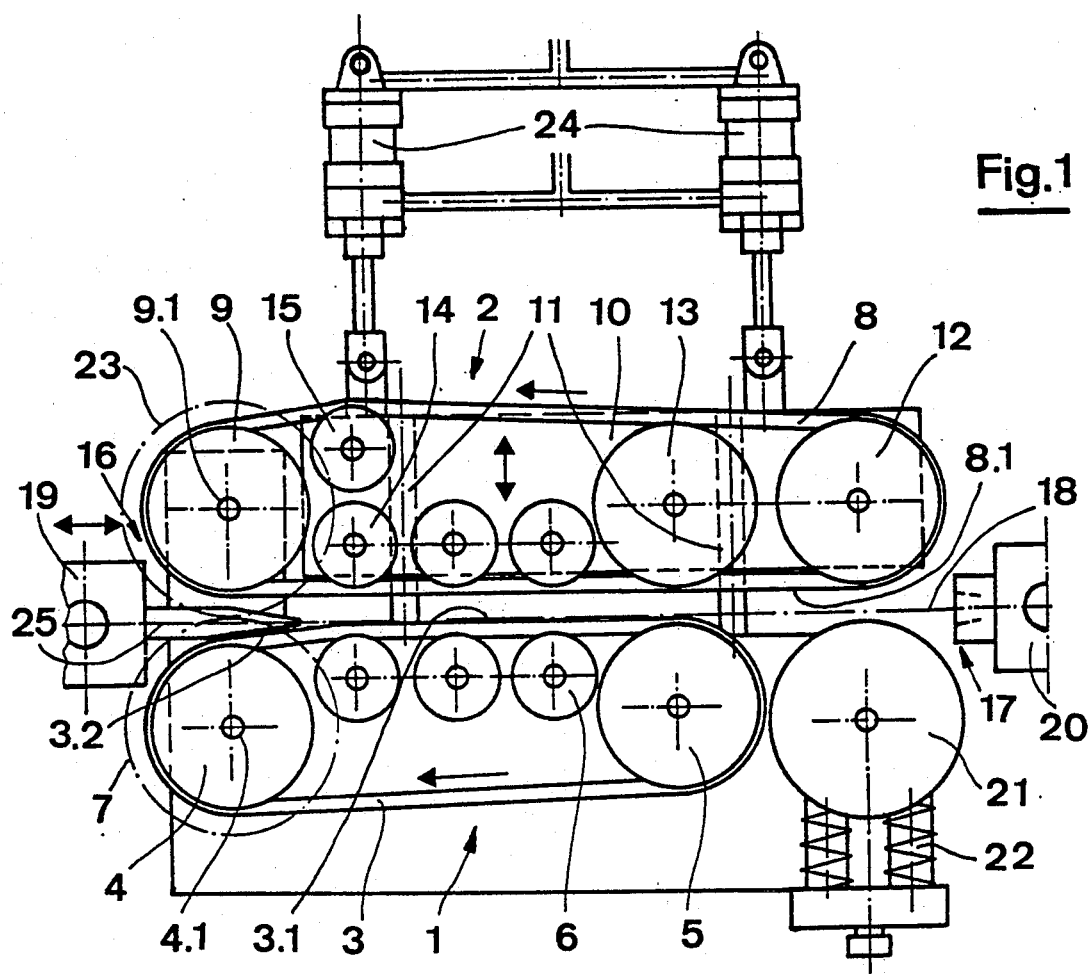
Figure 2:
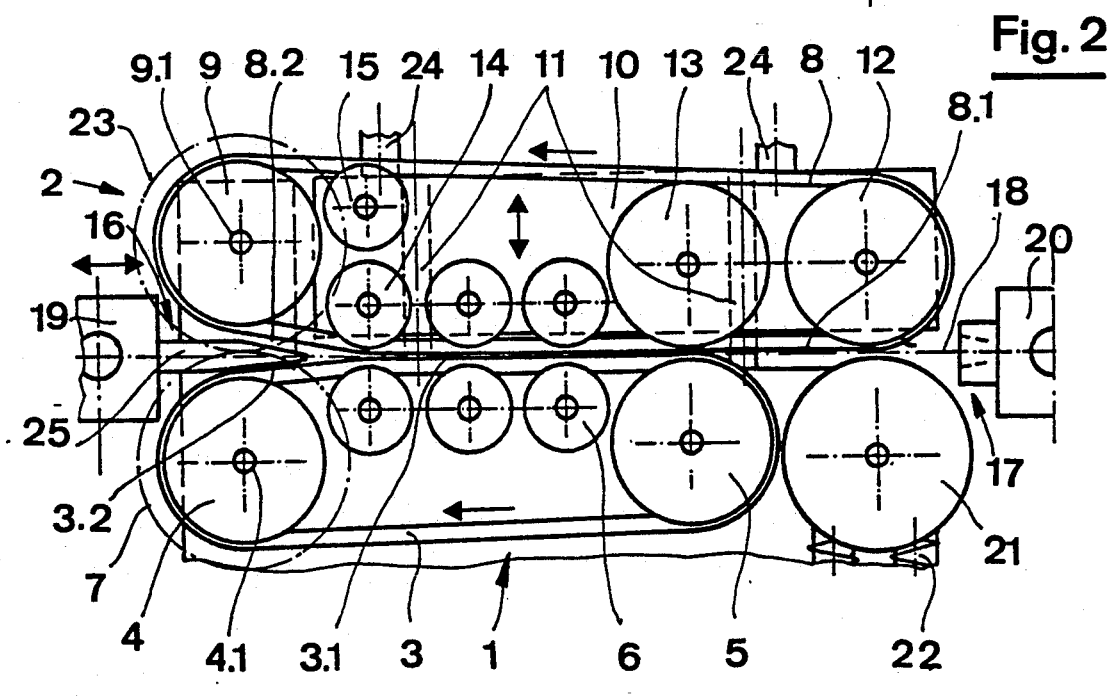
Figure 3:
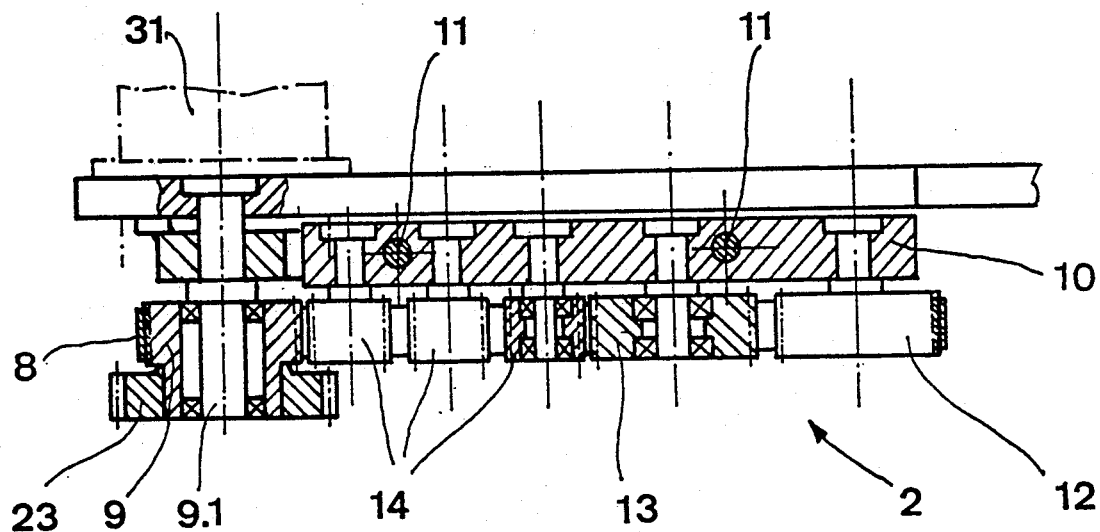
FIG. 3 is a sectional view along a section line 3'—3' of FIG. 1.
Figure 4:
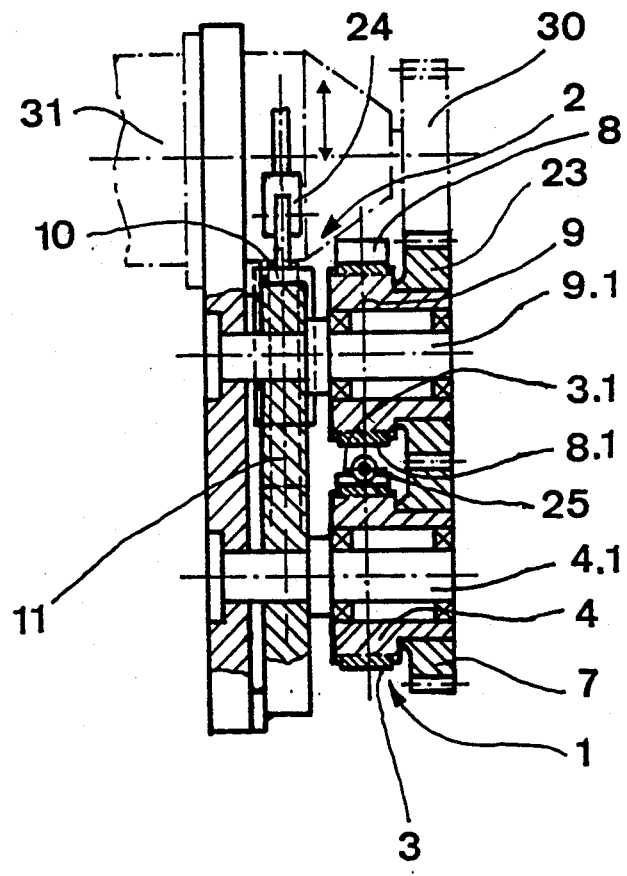
FIG. 4 is a sectional view along a section line 4'—4' of FIG. 1.

A stationary belt drive is denoted by 1 in the FIGS. 1 and 2. The stationary belt drive 1 display a toothed belt 3, a driven deflecting roller 4, a deflecting roller 5 and for example three pressure rollers 6. The deflecting roller 5 and the pressure roller 6 display unequal diameters, but are so arranged that, together with the toothed belt 3, they form a driving surface 3.1 lying in one plane. The alxe 4.1 of the driven deflecting roller 4 is so borne relative to the pressure roller 6 that the toothed belt 3 runs at an inclination 3.2 into the driving surface 3.1. A toothed wheel 7 is arranged on the same axle 4.1. Provided opposite the stationary belt drive 1 is a displaceably borne belt drive 2 consisting of a toothed belt 8, a driven deflecting roller 9 borne to be rotatable on a fixedly arranged axle 9.1 and a carrier plate 10 borne to be displaceable. The fixedly arranged axle 9.1 displays an always constant axial spacing from the axle 4.1 of the stationary belt drive 1 and in addition carries a toothed wheel 23, which drives the deflecting roller 9 and engages into the toothed wheel 7 driving the stationary belt drive 1. A not illustrated drive engaged by a toothed pinion into one of the toothed wheels 7 and 23 and drives both the belt drives 1 and 2. The displaceably borne carrier plate 10 of the displaceably borne belt drive 2 is for example slidingly guided on two guide rail spigots 11 arranged prependicularly to the driving surface 3.1. The carrier plate 10 receives a deflecting roller 12, a pressure roller 13, for example three smaller pressure rollers 14 and a compensating roller 15. The deflecting roller 12 and the pressure rollers 13 and 14 are so arranged on the carrier plate 10 that, together with the toothed belt 8, they always form a driving surface 8.1 lying in one plane and extending parallelly to the driving surface 3.1 of the fixed belt drive 1. The carrier plate 10 can be moved with the aid of a driving unit, for example two pneumatic piston-cylinder units 24, towards the stationary belt drive 1, wherein the driving surface 8.1 of the displaceably borne belt drive 2 is urged against the driving surface 3.1 of the stationary belt drive 1. The compensating roller 15 serves to keep the toothed belt 8 of the displaceably borne belt drive 2 under tension in the extended rest position or to take up a length reserve of the toothed belt 8, which is needed for the displacement of the carrier plate 10 with the tensioning rollers 13 and 14 and the deflecting roller 12 into the operational setting, in the extended rest setting. A wire or cable 18 is laid between the driving surfaces 3.1 and 8.1 of both the toothed belts 3 and 8 each rolling along on the other. The pressure rollers 6 and the deflecting roller 5 of the stationary belt drive 1 lie in the manner of rollers opposite the pressure rollers 14 and 13 of the displaceably borne belt drive 2 so that the wire or the cable 18 is entrained by both the runs, which are moved in the same direction, of the belt drives 1 and 2 driven in opposite sense. The cable 18 is led on the cable feed side 16 through a clamping and tightening device 19 borne to be displaceable in the axial direction of the advanced cable 18 and on the cable exit side 17 through a clamping device 20. A not illustrated automatic cable-processing machine with, for example, a cutting and a cable-stripping apparatus and possibly a crimping press is arranged behind the clamping device 20. The driving surface 8.1 of the displaceably borne belt drive 2 projects beyond the driving surface 3.1 of the stationary belt drive 1 with the aid of the deflecting roller on the cable exit side 17. Arranged at the end of this projecting driving surface 8.1 and opposite the deflecting roller 12 is a driving roller 21 of a cable length-measuring equipment 22, which is equipped with an adjustable feed setting which enables an entrainment of the driving roller 21 by the moved cable, however prevents an entrainment by the toothed belt 8 of the displaceably borne belt drive 2 when the cable 18 is absent.

The aforedescribed apparatus for the feeding of an electrical conductor or a cable 18 into an automatic cable-processing machine operates as following: A selected cable 18 is led, in the extended rest state of the belt drives 1 and 2 with the toothed belts 3 and 4 not driven, manually through the clamping and tightening device 19, between the toothed belt 3 and 8 of both the belt drives 1 and 2 and through the clamping device 20. The cable is clamped by the clamping and tightening device 19 and by the clamping device 20, tensioned by the clamping and tightening device and the displaceably borne belt drive 2 is set on, for example with the aid of both the pneumatic piston-cylinder units 24, until the drawn-in cable 18 is held fast between both the driving surfaces 3.1 and 8.1 of the belt drives 1 and 2. In that case, the displaceably borne carrier plate 10 of the displaceable belt drive 2 is parallely guided together with the pressure rollers 13 and 14, the clamping roller 12 and the compensating roller 15 through both the guide spigots 11 and moved against the stationary belt drive 1, whilst the driven deflecting roller 9 of the displaceable belt drive 2 retains its position. The carrier plate 10 is so guided by the guide spigots 11 that the formed driving surface 8.1 of the toothed belt 8 displaces parallelly towards the driving surface 3.1 of the toothed belt 3 of the stationary belt dirve 1. A greater axial spacing arises between the fixedly arranged deflecting roller 9 and the first pressure roller 14 so that the toothed belt 8 also at the displaceable belt drive 2 in the retracted operational setting (FIG. 2) runs into the driving surface 8.1 at an inclination 8.2. Within both the inclinations 3.2 and 8.2, a stationary, conically converging guide bush 25 leads the cable 18 exactly between the driving surfaces 3.1 and 8.1 of the belt drives 1 and 2. On displacement of the driving surface 8.1 of the displaceable belt drive 2 towards the driving surface 3.1 of the stationary belt drive 1, the lower belt run of the toothed belt 8 is tightened, whilst the upper belt run is relieved at the same time by the entrainment of the compensating roller 15. The compensating roller 15 has the effect that the displaceable belt drive in spite of the stationary drive deflecting roller 9 displays approximately the same belt tension for every setting between the extended rest setting (FIG. 1) and the retracted operational setting (FIG. 2). Both toothed belts 3 and 8 are additionally tightenable by a respective not illustrated tightening device. Due to the driving surface 8.1 of the displaceable belt drive 2 projecting beyond the driving surface 3.1 of the stationary belt drive 1, the surface of the driving roller 2 of the cable length-measuring equipment 22 also comes into contact with the firmly clamped cable 18. The driving roller 21 of the cable length-measuring equipment 22 can execute a limited travel perpendicularly to the direction of movement of the cable 18 and is urged against the cable 18 by the force of springs and later driven by the moved cable 18.

The clamping device 20 and the clamping and tightening device 19 are now released and the drive for the belt drives is switched on at the same time and by way of the toothed wheels 7 and 23 drives both belt drives 1 and 2 simultaneously and at the same speed. The cable 18 is moved forward and the cable end is led through the not illustrated cutting device and stopped and a first cut is carried out, the end of the cable is stripped of insulation and provided with a crimped contact. A certain cable length is preset for the cable length-measuring apparatus. The cable feeder is thereby ready for the automatic operation, in which both the driven belt drives moves the cable forward. The cable in its turn drives the driving roller of the cable length-mesuring apparatus until the preset cable length is reached and the length-measuring apparatus delivers the pulse for the stopping of the belt drives and the control programme sets in for the retention of the cable in the cutting device, for the actuation of the cutting blade of the insulation-stripping apparatus, the crimping press and so forth and for the repetition of the described process.

In the FIGS. 1 and 2 and in the present description, two belt drives are illustrated, in which the stationary belt drive displays four rollers arranged in one plane and the displaceable belt drive displays five rollers arranged in one plane, which each together with the associated toothed belt form two oppsitely directed driving surfaces. It is readily feasible that also fewer or more rollers can serve for the formation of such driving surfaces; care is however to be taken that one roller of the stationary belt drive always co-operates with an oppositely disposed roller of the displaceable belt drive and that the displaceable belt drive always displays one roller more in one driving plane that the fixed belt drive, whereby a driving surface arises, which projects beyond the driving surface of the fixed belt drive and on which the driving roller of the cable length-measuring equipment is driven with the aid of the entrained cable.

Two commercially usual toothed belts of like kind are provided for both the described belt drives. It is however readily feasible to provide two toothed belts with different surface hardnesses for a softer and a harder driving surface or to equip one belt drive with a double-sided toothed belt and the second with a normal toothed belt.

Instead of the manual introduction, mentioned in the description of a selected cable into the cable feeder, it is readily feasible to provide an apparatus which selects a predetermined cable and lays this automatically into the cable feeder.

It will be understood that each of the elements described above, or two or more together, may also find a useful application in other types of cable-feed methods and devices differing from the types described above.

While the invention has been illustrated and described as embodied in the context of a method and apparatus for feeding cable to a cable processor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method for the feeding of a cable into an automatic cable-processing machine, wherein the cable processing machine comprises a stationary belt drive including toothed belts of a stationary belt drive and of a slidably disposed belt drive; a cable clamping and tightening device having spaced apart driving surfaces (3.1, 8.1) of toothed belts (3, 8) of a stationary belt drive (1);

a slidably disposed belt drive (2);

a driving roller (21) forming together with the slidably disposed belt drive a cable length-measuring apparatus (22);

a cable-clamping device (20), wherein a selected cable (18) is led through the cable clamping and tightening device (19);

comprising the steps placing a selected cable (18) between the spaced apart driving surfaces (3.1, 8.1) of toothed belts (3, 8) of the stationary belt drive (1) and of the slidably disposed belt drive (2) and over the driving roller (21) of the cable length-measuring apparatus (22); leading the selected cable (18) through the cable-clamping device (20);

clamping the selected cable (18) by the clamping and tightening device (19) and by the clamping device (20);

tightening the selected cable (18) by a displacement of the clamping and tightening device (19); 'tensioning the selected cable (18);

sliding the slidably disposed belt drive (2) onto the tensioned selected cable (18);

pressing the slidably disposed belt drive (2) onto the tensioned selected cable (18) by a force;

driving both of the belt drives (1, 2) in mutually opposite direction of rotation with simultaneous opening of the clamping and tightening device (19) and the clamping device (20);

moving the selected cable (18) forwards;

driving the driving roller (21) of the cable length-measuring apparatus (22);

interrupting the movement of the selected cable (18);

determining then an exact preset cable length;

cutting the selected cable (18) for resulting in a cable exhibiting two ends;

stripping the two ends of the selected cable (18) of insulation;

leading the cut-off cable (18) aqay; and moving the remaining selected cable (18) forwards again by the preselected cable length.

2. Apparatus for the performance of the method for the feeding of a cable into an automatic cable-processing machine, comprising two oppositely directed belt drives (1, 2) and a cable length-measuring apparatus (22) measuring a preset length of a cable portion, wherein a first belt drive (1) with two deflecting rollers (4, 5) and a toothed belt (3) is fixedly arranged, and wherein a second belt drive comprises a fixed drivable deflecting roller (9) and a pressure means device wherein the pressure means device is parallel slidably supported and disposed perpendicular to feed direction of a cable (18) and wherein the presuure means device supports a second deflecting roller, and which by a force presses a toothed belt (8) of a second belt drive (2) either against the toothed belt (3) of the first belt drive (1) or against the selected cable (18) laid in between both toothed belts (3, 8) and moves the selected cable (18) through both the driven toothed belts (3, 8) towards a clamping device (20), characterised thereby, that the first and fixedly arranged first belt drive (1) displays a driving surface (3.1), which is formed between the defelcting roller (5) not driven and at least one pressure roller (6) and the pressure means device of the second belt drive (2) displays a plate (10), a pressure roller (13) arranged opposite the not driven deflecting roller (5), a salient deflecting roller (12) and at least one further pressure roller (14), wherein the deflecting roller (12) and pressure rollers (13, 14) together with the toothed belt (8) form a driving surface (8.1) projecting beyond the driving surface (3.1) of the fixed belt drive (1), that at least one pneumatic piston-cylinder unit, which is capable of displacing the driving surface (8.1) of the second belt drive (2) towards the driving surface (3.1) of the first belt drive (1), is articulated at the carrier plate (10), that a driving roller (21) of the cable length-measuring apparatus is arranged in the region of the protruding driving surface (8.1) and opposite the deflecting roller (12) of the second belt drive (2) and that a clamping and tightening device (19), which is borne to be displaceable in the axial direction of the selected cable (18) and which clamps and tightens the cable (18), is provided on a cable feed side (16) and a fixed clamping device (20), which clamps the cable (18), is provided on the cable exit sides (17).

3. Apparatus according to claim 2, characterised thereby, that a compensating roller (15), which tightens the loose run when the belt drive (2) is retracted, is arranged on the carrier plate (10) of the displaceably borne belt drive (2).

4. Apparatus according to claim 2, characterised thereby, that both the toothed belts (3, 8) display differently hard driving surfaces (3.1, 8.1) for the driving of the cable (18).

5. Apparatus according to claim 2, characterised thereby, that at least one of the toothed belts (3, 8) of the belt drives (1, 2) is a double-sided toothed belt.

6. Apparatus according to claim 2, characterised thereby, that the driving roller (21), which is driven by the moved cable (18), of the cable length-measuring apparatus (22) displays an adjustable advancing apparatus which presses against the cable (18) by the force of springs and does not touch the toothed belt (8) when the cable is absent.

* * * * *